United States Patent [19]

Kadakia et al.

[11] Patent Number: 5,611,001
[45] Date of Patent: Mar. 11, 1997

[54] ADDRESS REDUCTION SCHEME IMPLEMENTING ROTATION ALGORITHM

[75] Inventors: Vinod Kadakia, Rancho Palos Verdes; Christine Kang, Los Angeles, both of Calif.

[73] Assignee: Xerox Corporation, Stamford, Conn.

[21] Appl. No.: 812,343

[22] Filed: Dec. 23, 1991

[51] Int. Cl.$^6$ .................................................. G06T 3/60
[52] U.S. Cl. ..................... 382/297; 345/126; 395/137
[58] Field of Search ......................... 382/27, 46, 45, 382/296, 297; 365/230.01, 230.02, 230.03, 230.04; 340/727; 395/137, 138; 345/126

[56] References Cited

U.S. PATENT DOCUMENTS

| | | | |
|---|---|---|---|
| 4,168,488 | 9/1979 | Evans | 382/46 |
| 4,477,802 | 10/1984 | Walter et al. | 340/727 |
| 4,953,134 | 8/1990 | Kobayashi | 365/230.03 |
| 5,111,192 | 5/1992 | Kadakia | 340/727 |

OTHER PUBLICATIONS

Sedra et al. *Microelectronic Circuits* Saunders College Publishing, 1991, pp. 956–958.
Johnson, Everett L. and Karim, Mohammad A. "Digital Design: A Pragmatic Approach," PWS Publishers, 1987, p. 413.

*Primary Examiner*—Edward L. Coles, Sr.
*Assistant Examiner*—Jon Chang
*Attorney, Agent, or Firm*—Robert Cunha

[57] ABSTRACT

In a circuit for rotating a digital image any multiple of ninety degrees, an addressing method which reduces the number of address lines required. The rotation circuit relies on a memory configuation which can access each image pixel in memory individually, and this normally requires a large number of address lines. This invention takes advantage of the periodic nature of the data being accessed to reduce the number of address lines required.

2 Claims, 7 Drawing Sheets

|   | RAM 0 |   |   |   | RAM 15 |
|---|---|---|---|---|---|
| 15 | 15L0 | | | | |
| 14 | 14L0 | | | | |
| WORD OR ROW # | ⋮ | | | | |
| 2 | 2L0 | | | | |
| 1 | 1L0 | | | | |
| 0 | 0L0 | 0L1 | 0L2 · · · · · · · · · · · · · 0L14 | | 0L15 |

( SCAN DIRECTION ⟶ )
O.K.

*FIG. 1*

| RAM 0 | RAM 1 | RAM 2 | | RAM 14 | RAM 15 |
|---|---|---|---|---|---|
| | | | | | 15L0 |
| | | | | 14L0 | |
| | | | | | |
| | | 2L0 | | | |
| | 1L0 | | | | |
| 0L0 | 0L1 | 0L2 | | 0L14 | 0L15 |

*FIG. 2*

| RAM0 | RAM1 | RAM2 | RAM3 | RAM4 | RAM5 | RAM6 | RAM7 |
|---|---|---|---|---|---|---|---|
| 5L15 | 6L15 | 7L15 | 4L15 | 9L15 | 10L15 | 11L15 | 8L15 |
| 6L14 | 7L14 | 4L14 | 5L14 | 10L14 | 11L14 | 8L14 | 9L14 |
| 7L13 | 4L13 | 5L13 | 6L13 | 11L13 | 8L13 | 9L13 | 10L13 |
| 4L12 | 5L12 | 6L12 | 7L12 | 8L12 | 9L12 | 10L12 | 11L12 |
| 9L11 | 10L11 | 11L11 | 8L11 | 13L11 | 14L11 | 15L11 | 12L11 |
| 10L10 | 11L10 | 8L10 | 9L10 | 14L10 | 15L10 | 12L10 | 13L10 |
| 11L9 | 8L9 | 9L9 | 10L9 | 15L9 | 12L9 | 13L9 | 14L9 |
| 8L8 | 9L8 | 10L8 | 11L8 | 12L8 | 13L8 | 14L8 | 15L8 |
| 13L7 | 14L7 | 15L7 | 12L7 | 11L7 | 2L7 | 3L7 | 0L7 |
| 14L6 | 15L6 | 12L6 | 13L6 | 2L6 | 3L6 | 0L6 | 11L6 |
| 15L5 | 12L5 | 13L5 | 14L5 | 3L5 | 0L5 | 11L5 | 2L5 |
| 12L4 | 13L4 | 14L4 | 15L4 | 0L4 | 11L4 | 2L4 | 3L4 |
| 11L3 | 2L3 | 3L3 | 0L3 | 5L3 | 6L3 | 7L3 | 4L3 |
| 2L2 | 3L2 | 0L2 | 11L2 | 6L2 | 7L2 | 4L2 | 5L2 |
| 3L1 | 0L1 | 11L1 | 2L1 | 7L1 | 4L1 | 5L1 | 6L1 |
| 0L0 | 11L0 | 2L0 | 3L0 | 4L0 | 5L0 | 6L0 | 7L0 |

| RAM8 | RAM9 | RAM10 | RAM11 | RAM12 | RAM13 | RAM14 | RAM15 |
|---|---|---|---|---|---|---|---|
| 13L15 | 14L15 | 15L15 | 12L15 | 11L15 | 2L15 | 3L15 | 0L15 |
| 14L14 | 15L14 | 15L14 | 13L14 | 2L14 | 3L14 | 0L14 | 11L14 |
| 15L13 | 12L13 | 13L13 | 14L13 | 3L13 | 0L13 | 11L13 | 2L13 |
| 12L12 | 13L12 | 14L12 | 15L12 | 0L12 | 11L12 | 2L12 | 3L12 |
| 11L11 | 2L11 | 3L11 | 0L11 | 5L11 | 6L11 | 7L11 | 4L11 |
| 2L10 | 3L10 | 0L10 | 11L10 | 6L10 | 7L10 | 4L10 | 5L10 |
| 3L9 | 0L9 | 11L9 | 2L9 | 7L9 | 4L9 | 5L9 | 6L9 |
| 0L8 | 11L8 | 2L8 | 3L8 | 4L8 | 5L8 | 6L8 | 7L8 |
| 5L7 | 6L7 | 7L7 | 4L7 | 9L7 | 10L7 | 11L7 | 8L7 |
| 6L6 | 7L6 | 4L6 | 5L6 | 10L6 | 11L6 | 8L6 | 9L6 |
| 7L5 | 4L5 | 5L5 | 6L5 | 11L5 | 8L5 | 9L5 | 10L5 |
| 4L4 | 5L4 | 6L4 | 7L4 | 8L4 | 9L4 | 10L4 | 11L4 |
| 9L3 | 10L3 | 11L3 | 8L3 | 13L3 | 14L3 | 15L3 | 12L3 |
| 10L2 | 11L2 | 8L2 | 9L2 | 14L2 | 15L2 | 12L2 | 13L2 |
| 11L1 | 8L1 | 9L1 | 10L1 | 15L1 | 12L1 | 13L1 | 14L1 |
| 8L0 | 9L0 | 10L0 | 11L0 | 12L0 | 13L0 | 14L0 | 15L0 |

*FIG. 3*

| DRAMs | ADDRESS LINES |
|---|---|
| DRAM0 | addr-e [3:2], addr-a [1:0] |
| DRAM1 | addr-e [3:2], addr-b [1:0] |
| DRAM2 | addr-e [3:2], addr-c [1:0] |
| DRAM3 | addr-e [3:2], addr-d [1:0] |
| DRAM4 | addr-f [3:2], addr-a [1:0] |
| DRAM5 | addr-f [3:2], addr-b [1:0] |
| DRAM6 | addr-f [3:2], addr-c [1:0] |
| DRAM7 | addr-f [3:2], addr-d [1:0] |
| DRAM8 | addr-g [3:2], addr-a [1:0] |
| DRAM9 | addr-g [3:2], addr-b [1:0] |
| DRAM10 | addr-g [3:2], addr-c [1:0] |
| DRAM11 | addr-g [3:2], addr-d [1:0] |
| DRAM12 | addr-h [3:2], addr-a [1:0] |
| DRAM13 | addr-h [3:2], addr-b [1:0] |
| DRAM14 | addr-h [3:2], addr-c [1:0] |
| DRAM15 | addr-h [3:2], addr-d [1:0] |
| TOTAL ADDRESS LINES REQUIRED | 16 ADDRESS LINES |

*FIG. 6*

ADDRESS REDUCTION SCHEME IMPLEMENTING ROTATION ALGORITHM

BACKGROUND OF THE INVENTION

This invention is in the field of digital image handling and, more particularly, is an improved circuit for the rotation of a digital image by a multiple of 90 degrees.

It is frequently necessary to rotate a digital image by multiples of 90 degrees, or to create the mirror images of these rotations. A method and circuit for producing these rotations at high speed without the necessity of special hardware is described in commonly owned patent applications Ser. No. 07/453,738 entitled "Method to Rotate a Bitmap Image 90 Degrees", and Ser. No. 07/721,797, "Parallel Rotation Algorithm" which are incorporated herein by reference.

To use a numerical example, the method can be explained as the addition of the rotation of the bits within each 4 by 4 bit block and the rotation of the blocks of the whole image. To rotate bits within a block, the first 4 bit word is loaded into the first line of a 4 by 4 bit buffer. The next word is circularly rotated upward one bit and loaded into the second line of the buffer. The third word is circularly shifted two bits and loaded into the third line of the buffer and the fourth line is circularly shifted three bits and loaded into the fourth line of the buffer. At this point a vertical line in the original image is still a vertical line in the buffer, but a horizontal line in the original is now a diagonal line in the buffer.

Since the buffer is implemented from 4 by 1 bit devices, any bit in each device is addressable independently of the other devices, and a bit in one word in the buffer can be loaded into, or read from, any bit of the four words of memory. Therefore, if the bits in the buffer are addressed along diagonal lines parallel to the diagonal line in the buffer and read out as single 4-bit words, the diagonal line in the buffer will become a vertical line at the output. Continuing with addressing the bits along diagonal lines, the vertical line in the buffer will become a diagonal line at the output. The output four words are then shifted to line up the diagonal bits into a horizontal line. Since this line started as a vertical line, it can be seen that the 4 by 4 bit block has now been completely rotated 90 degrees. To rotate the blocks within the image, a simple addressing algorithm provides that each block of the original image is read into the correct block of the page buffer.

Of course, the algorithm can be scaled up to larger sizes. However, in these larger sizes, the number of address lines becomes excessive. For example, in a sixteen line by sixteen bit buffer implemented from 16 by 1 bit RAM devices, sixty-four address lines would be required.

SUMMARY OF THE INVENTION

As described in the referenced patents, the patented process is to circularly shift the data so that one of the two orthogonal directions in the original becomes a diagonal, to reorganize the data so that the diagonal becomes a line 90 degrees away from its original direction and the other original orthogonal direction becomes a diagonal, and circularly shift to line up the second diagonal to become a line 90 degrees away from its original direction. The reorganization of the data is accomplished by reading the shifted data into, and then out of, a buffer implemented from memory devices, and there is an option of either writing directly into the buffer along horizontal lines and reorganizing it as it is read out, or to reorganize it as it is written into the buffer, and reading it out directly in horizontal lines. For ease of explanation, for the remainder of this application it will be assumed that the data will be reorganized while it is being read out from the buffer.

This invention reduces the number of address lines for the above example from 64 to sixteen by taking advantage of the periodic nature of the addressing function. Specifically, if the buffer is divided into 4-bit by 4-bit blocks, then, during the reorganization of the shifted image data, the address of the bit to be accessed in each block is identical. For a numerical example, Let us assume that the bits to be addressed are bit 0 of RAM 0, bit 1 of RAM 1, . . . and bit 15 of RAM 15. If the entire buffer were divided into blocks of 4 by 4 bits, then four of the bits to be accessed first are bit 0 of block 0 of RAM 0, bit 0 of block 1 of RAM 4, bit 0 of block 2 of RAM 8, and bit 0 of block 3 of RAM 12. Since the bit (the 0 bit in this case) is the same in each 4 by 4 bit block, the same 2-bit address lines, which turns out to be the least 2 significant address lines, can be applied to each of the four RAM's.

Using this system of addressing, and continuing with the example, the following number of address lines are also necessary. Two address lines to the first four RAM's to specify the first 4-bit block, and similarly two to the second, two to the third and two to the fourth. Adding these to the two address lines to RAMS 0, 4, 8 and 12 to specify the first word in the block, and similarly two to RAM's 1, 5, 9 and 13, two to RAM's 2, 6, 10 and 14, and two to RAM's 3, 7, 11 and 15; results in a total of 16 address lines.

The same set of address lines is also used when reading data in or out along horizontal lines. Here, the four sets of least, and most, significant address lines will have the same data.

Using this system, which takes advantage of the fact that the bits are always read in or out along diagonal or horizontal lines of the memory, the number of address lines can be reduced by a factor of four.

BRIEF DESCRIPTIONS OF THE DRAWINGS

FIG. 1 is a diagram showing the arrangement of the original image data.

FIG. 2 is a diagram showing the arrangement of the data after the first shift.

FIG. 3 is a diagram showing the arrangement of the reorganized data after being loaded into the buffer.

Figure 5A:
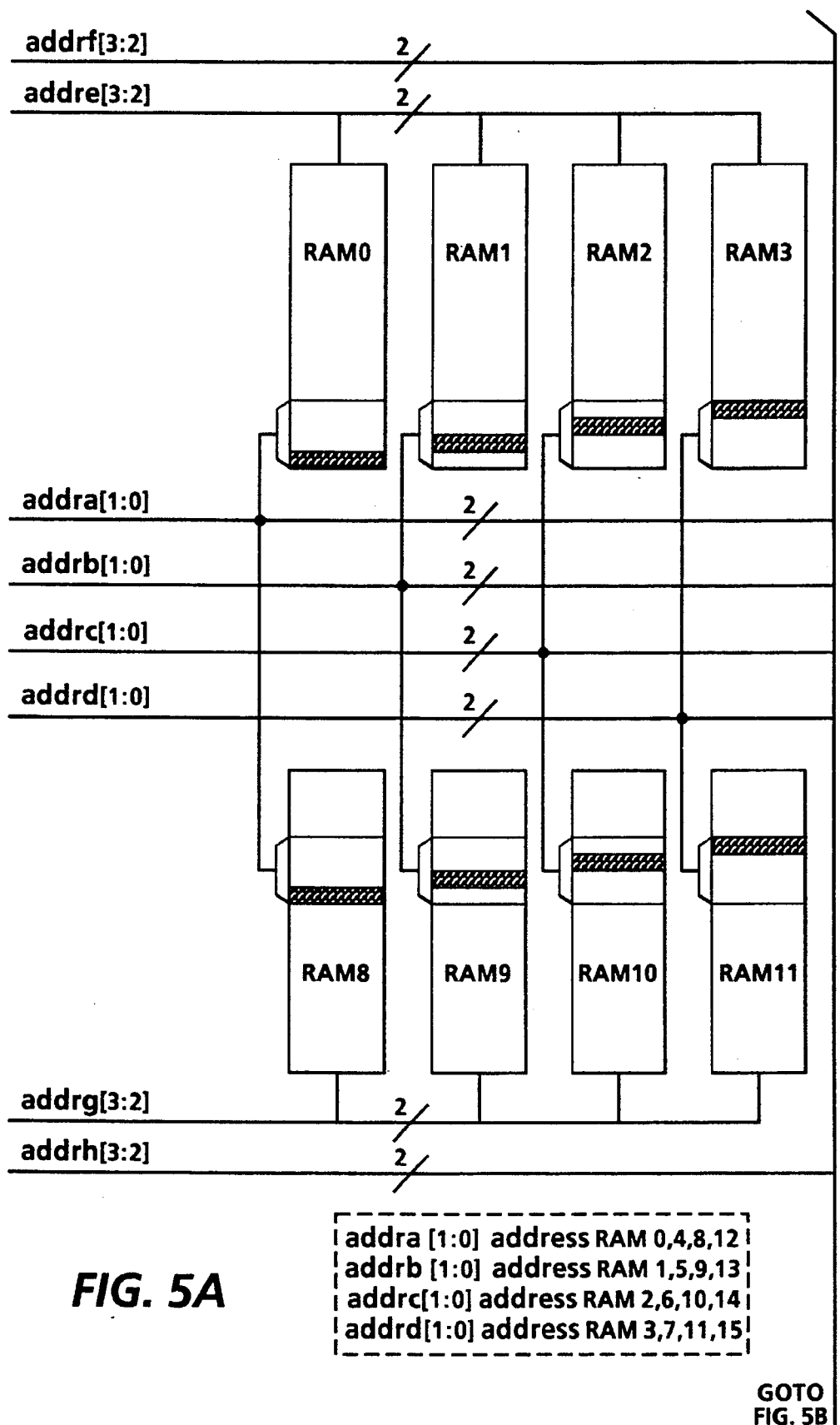
Figure 5B:
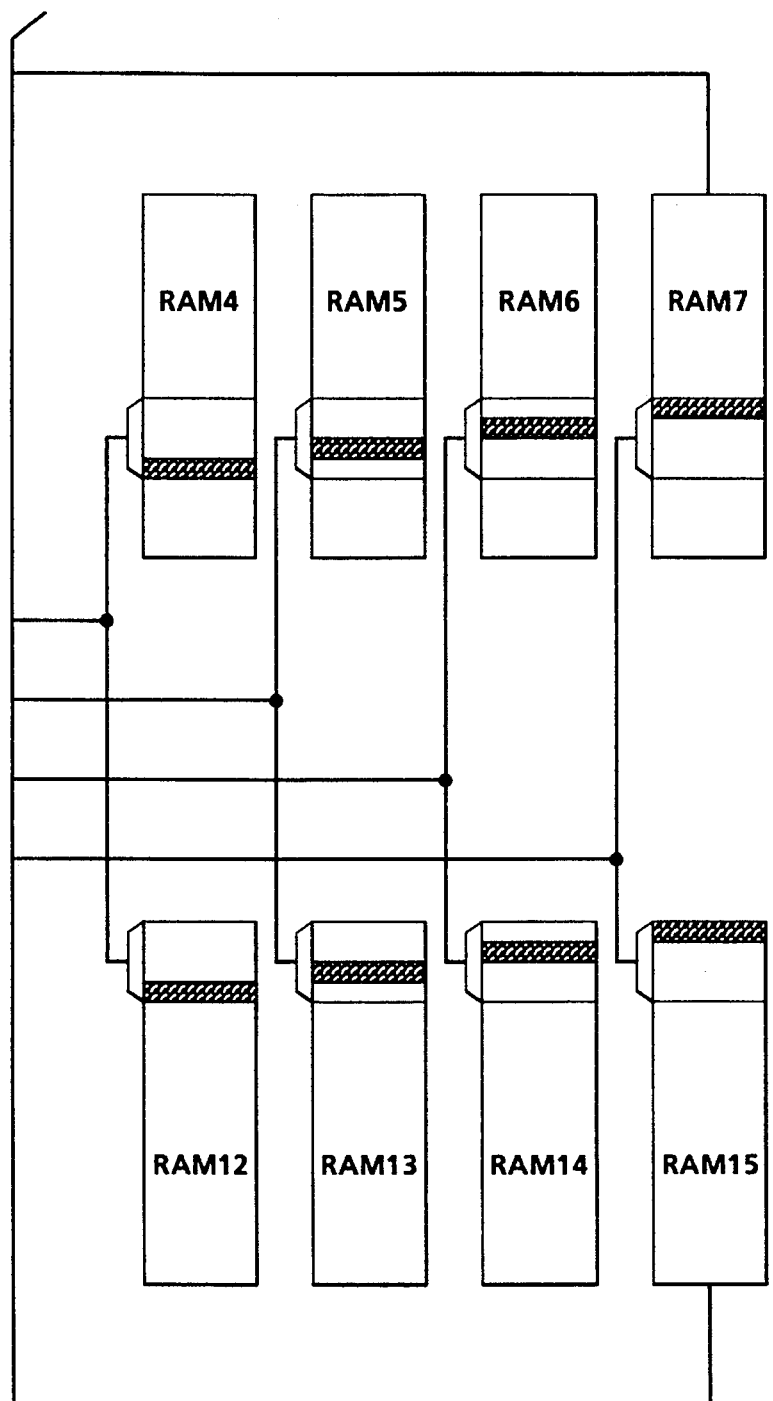

FIG. 5, comprising FIG 5A and FIG. 5B, shows the arrangement of the addressing lines.

FIG. 6 identifies the address lines in tabular form.

DETAILED DESCRIPTION OF THE INVENTION

The invention will be discussed using an example of a 16 by 16 bit image. FIG. 1 shows the organization of the original image, comprising sixteen lines, each having 16 bits. The first word, a horizontal line, is the sixteen bits along the bottom edge of the image, and each bit, from bit 0 to bit 15 resides in a separate RAM. The left edge of the image is vertical and consists of the first bit of every line, the entire vertical line being contained in RAM 0.

The first step is to circularly shift each horizontal line by the word number, resulting in the arrangement of FIG. 2. In this form, the original horizontal lines in the original are still horizontal, but the vertical lines in the original are now diagonal.

This data is now read into the buffer by loading each horizontal line of the FIG. 2 data into diagonal lines of the buffer to result in the arrangement of data shown in FIG. 3. Notice that at this point the horizontal lines of the original image are now vertical, and the original vertical lines are now diagonal.

Figure 4:
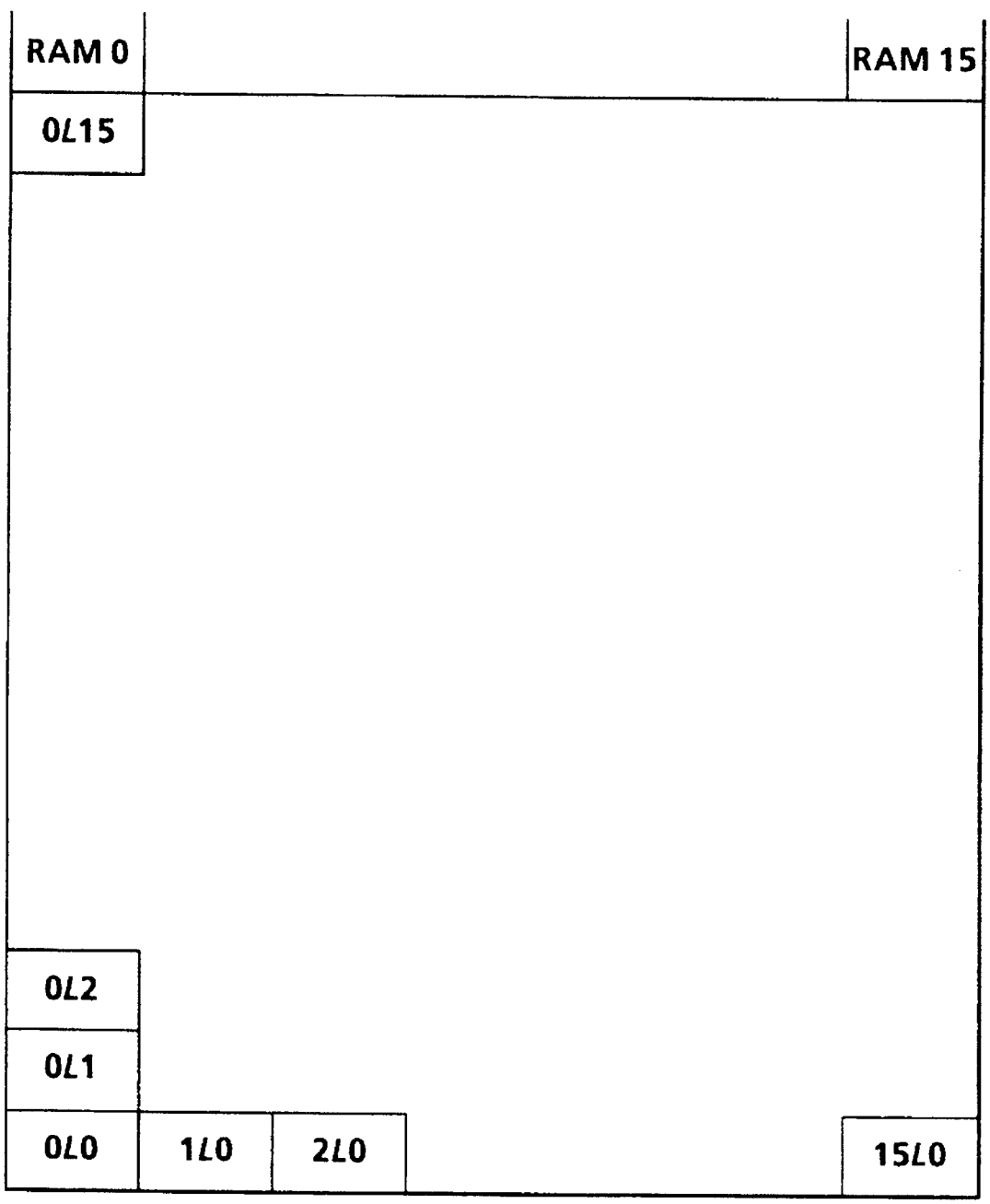
FIG. 4 is a diagram showing the arrangement of the data after the second shift in its fully rotated form.

The final step is to read out the buffer data, line by line, and circularly shift to the left by the word number, resulting in the data organization of FIG. 4, where the original horizontal lines are now vertical and the original vertical lines are now horizontal. This final result happens to the mirror image of a rotation of 90 degrees. Other rotations and their mirror images can be produced by varying the directions of the shifts and diagonals.

In addition, by choice of the designer, the reorganization of the data can be done while the data is loaded into the buffer, or when it is read out. In either case, one addressing step requires that the data be addressed one horizontal line at a time, and the other requires that the data be addressed on diagonal lines, and in either case, the bit number of the bit being addressed in each 4 bit block will be the same. This is shown in FIG. 5.

Each RAM is 16 by 1 bit to result in a total image size of 16 by 16 bits, and this image is divided into 4 by 4 bit blocks, block 0 in RAM's 0–3, block 1 in RAM's 4–7, etc. Now, because of the cyclical nature of the data, when diagonal lines of data are read in or out, the least significant two bits for addressing the first RAM of all four blocks will be the same. So will the least significant two bits of RAM's 1, 5, 9 and 13, etc. Therefore the least significant two addressing lines, shown here as lines 0 and 1, can be shared by RAM's 0, 4, 8 and 12, as shown in FIG. 5. Similarly, these two least significant lines can be shared by RAM's 1, 5, 9 and 13, etc. Thus, eight lines are required.

Similarly, the next two significant address lines are the ones that separate the buffer into 4 columns. These are labelled address lines 2 and 3. RAM's 0–3 have common lines, RAM's 4 through 7 have common lines, etc. Thus, eight lines are required. Therefore, a total of 16 lines are required to fully address the memory. This is shown in FIG. 5.

The address lines for each RAM are identified in tabular form in FIG. 6. Here, eight sets (a through h) of address lines, two lines (which may be lines 0, 1, 2 or 3) per set are identified. For example, RAM 0 is addressed by lines 3 and 2 of set e and lines 1 and 0 of set a, the sets being identified in FIG. 5.

The above is a description of a specific embodiment. This addressing scheme can be generalized for any size memory and image as follows.

The general description of the invention would be a circuit for transferring a data block of $2^{(n+m)}$ bits by $2^{(n+m)}$ bits into or out of memory devices along diagonal lines with said data block transfer taking place $2^n$ bits at a time, comprising, $2^n$ memory devices, numbered from i=0 to $2^n-1$, each memory device having n+2m address inputs and containing $2^{(n+2m)}$ bits of data, said $2^n$ memory devices partitioned into subgroups of $2^k$ memory devices each, wherein the address lines of all memory devices in each subgroup share n-k address lines which are not shared by any other memory devices in any other subgroups, the ith memory devices of all subgroups share k address lines not shared by any other memory devices, and all memory devices share $2^m$ address lines with the total number of address lines being $(n-k)2^{(n-k)}+k2^k+2m$.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A circuit for transferring a data block of $2^{(n+m)}$ by $2^{(n+m)}$ bits into or out of memory devices along diagonal lines with said data block transfer taking place $2^n$ bits at a time, comprising:

$2^n$ memory devices, numbered i=0 to $2^{n-1}$, each memory device having n+2m address lines and containing $2^{(n+m)}$ bits of data, said $2^n$ memory devices partitioned into subgroups of $2^k$ memory devices each, wherein the address lines of all the memory devices in each subgroup share n–k address lines which are not shared by any other memory devices in any other subgroups, the ith memory devices of all subgroups share k address lines not shared by any other memory devices, and all memory devices share 2m address lines with the total number of address lines being $(n-k)2^{(n-k)}+k2^k+2m$.

2. In a memory means for transferring a square data block of bits arranged in rows and columns, $2^n$ bits at a time, into or out of a memory along diagonal lines, said memory comprising a number of memory devices, an addressing arrangement comprising:

n–k address lines which are shared by all devices in each subgroup, and not shared by any other devices, k address lines which are shared equally by the $i^{th}$ numbered devices, and not shared by any other devices, and 2m address lines shared by all devices, the total number of address lines being $(n-k)2^{(n-k)}+k2^k+2m$, wherein, n=$\log_2$ of the number of said devices, i=the number of each device, said devices being numbered from i=0 to $2^{n-1}$, m=($\log_2$ of the number of bits in a row of said block divided by the number of said devices)–1, k=$\log_2$ of the number of said devices per subgroup where said number of devices is divided into subgroups, each subgroup having an equal number of devices, n+m=$\log_2$ of the number of bits in a row of said block, and n+2m=the number of address lines for each of said devices, and=$\log_2$ of the number of bits per device.

* * * * *